United States Patent
Tsirkin (10) Patent No.: US 10,073,710 B2
(45) Date of Patent: Sep. 11, 2018

(54) HOST-DRIVEN APPLICATION MEMORY PROTECTION FOR VIRTUAL MACHINES

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 252 days.

(21) Appl. No.: 15/053,825

(22) Filed: Feb. 25, 2016

(65) Prior Publication Data

US 2017/0249465 A1    Aug. 31, 2017

(51) Int. Cl.
*H04L 29/06* (2006.01)
*G06F 9/455* (2018.01)
*G06F 21/53* (2013.01)
*G06F 21/62* (2013.01)

(52) U.S. Cl.
CPC .......... *G06F 9/45558* (2013.01); *G06F 21/53* (2013.01); *G06F 21/629* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,849,287 B2 | 12/2010 | Hummel et al. | |
| 8,392,628 B2 | 3/2013 | Santos et al. | |
| 8,578,483 B2 | 11/2013 | Seshadri et al. | |
| 8,590,005 B2 * | 11/2013 | Payne, Jr. | G06F 21/53 713/166 |
| 8,631,170 B2 | 1/2014 | Tsirkin et al. | |
| 8,640,220 B1 * | 1/2014 | Vincent | G06F 9/5027 726/11 |
| 9,147,086 B1 | 9/2015 | Potlapally et al. | |
| 9,386,021 B1 * | 7/2016 | Pratt | H04L 63/10 |
| 9,733,980 B1 * | 8/2017 | Khan | G06F 9/4856 |
| 9,934,022 B2 * | 4/2018 | Marr | G06F 8/65 |

(Continued)

OTHER PUBLICATIONS

Sander, Oliver, et al. Hardware Virtualization Support for Shared Resources in Mixed-Criticality Multicore Systems. Design, Automation and Test in Europe Conference and Exhibition (Date). Pub. Date: 2014. https://ieeexplore.ieee.org/stamp/stamp.jsp?tp=&arnumber=6800282.*

(Continued)

*Primary Examiner* — Jeremiah Avery
(74) *Attorney, Agent, or Firm* — K&L Gates LLP (57) ABSTRACT

A memory protection system includes a memory, one or more physical processors, a hypervisor, and a virtual machine including a guest OS executing on the one or more processors. The hypervisor notifies the guest OS of a first location of a first device and a second location of a second device. The hypervisor specifies a first protection level for the first device and a second protection level for the second device. The hypervisor notifies the virtual machine of the first protection level and the second protection level. The guest OS maps a first memory page accessible by the first device and a second memory page accessible by the second device. The guest OS specifies a first trust level for the first device and a second trust level for the second device. The guest OS compares the trust levels and the protection levels associated with each device.

20 Claims, 4 Drawing Sheets

(56) References Cited

U.S. PATENT DOCUMENTS

| | | | |
|---|---|---|---|
| 2013/0086299 A1* | 4/2013 | Epstein | G06F 12/1475 |
| | | | 711/6 |
| 2013/0145051 A1 | 6/2013 | Kegel et al. | |
| 2013/0145055 A1 | 6/2013 | Kegel et al. | |
| 2013/0276056 A1* | 10/2013 | Epstein | G06F 21/604 |
| | | | 726/1 |
| 2014/0068137 A1 | 3/2014 | Kegel et al. | |
| 2014/0189690 A1 | 7/2014 | Ramakrishnan Nair | |
| 2016/0092678 A1* | 3/2016 | Probert | G06F 9/45558 |
| | | | 713/193 |
| 2017/0132430 A1* | 5/2017 | Sikka | G06F 21/6245 |

OTHER PUBLICATIONS

Mana, Antonio; Munoz, Antonio; Gonzalez, Javier. Dynamic Security Monitoring for Virtualized Environments in Cloud Computing. 2011 1st International Workshop on Securing Services on the Cloud (IWSSC). Pub. Date: 2011. https://ieeexplore.ieee.org/stamp/stamp.jsp?tp=&arnumber=6049018.*

Vicat-Blanc, Pascale et al. A scalable security model for enabling Dynamic Virtual Private Execution Infrastructures on the Internet. 9th IEEE/ACM International Symposium on Cluster Computing and the Grid, 2009. CCGRID '09. Pub. Date: 2009. https://ieeexplore.ieee.org/stamp/stamp.jsp?tp=&arnumber=5071891.*

Amit et al., "vIOMMU: Efficient IOMMU Emulation," publication date unknown, 14 pages.

Ben-Yehuda, "Operating System and Hypervisor Support for IOMMUs," Mar. 2008, 36 pages.

Linux Plumbers Conf 2014, "Exposing a virtual IOMMU interface to KVM guests," [retrieved from the Internet <URL: http://www.linuxplumbersconf.org/2014/ocw/sessions/2019> on Dec. 23, 2015], 4 pages.

* cited by examiner

HOST-DRIVEN APPLICATION MEMORY PROTECTION FOR VIRTUAL MACHINES

BACKGROUND

Computer systems may require various levels of memory protection for the plurality of devices used within the system. For example, a computer system may include physical devices and virtual devices, and each device may have access to different portions of memory of the computer system. Therefore, each device may pose a different security risk to the system. For example, malware on a virtual device may be more likely to cause a security risk than malware on a physical hardware device.

SUMMARY

The present disclosure provides new and innovative systems and methods of host-driven application memory protection for virtual machines. In an example embodiment, a system includes a memory, one or more physical processors in communication with the memory, a hypervisor executing on the one or more physical processors, and one or more virtual machines including at least one guest OS executing on the one or more processors. The memory includes a memory page. The hypervisor executing on the one or more physical processors is configured to notify a guest OS of a first virtual machine of a first location of a first device. The hypervisor is further configured to notify the guest OS of a second location of a second device. The hypervisor specifies a first protection level for the first device and a second protection level for the second device. The hypervisor notifies the one or more virtual machines of at least one of the first protection level of the first device and the second protection level of the second device. The guest OS, executing on the one or more physical processors, is configured to receive a first notification from the hypervisor of the first location of the first device. The guest OS maps a first memory page, which is accessible by the first device. The guest OS receives a second notification from the hypervisor of the second location of the second device and maps a second memory page, which is accessible by the second device. The guest OS specifies a first trust level for the first device and a second trust level for the second device. Additionally, the guest OS compares the first trust level and the first protection level.

In an example embodiment, a method includes notifying, by a hypervisor, a guest OS of a first virtual machine of a first location of a first device. The guest OS receives a first notification from the hypervisor of the first location of the first device and maps a first memory page, which is accessible by the first device. The method further includes notifying, by the hypervisor, the guest OS of a second location of a second device. The guest OS receives a second notification from the hypervisor of the second location of the second device and maps a second memory page, which is accessible by the second device. Additionally, the hypervisor specifies a first protection level for the first device and a second protection level for the second device. The guest OS specifies a first trust level for the first device and a second trust level for the second device. The method further includes notifying, by the hypervisor, the first virtual machine of the first protection level of the first device and/or the second protection level of the second device. Then, the guest OS compares the first trust level and the first protection level.

In an example embodiment, a non-transitory machine readable medium stores a program, which when executed by a processor, causes at least one guest OS of a first virtual machine to receive a first notification from a hypervisor of a first location of a first device. The at least one guest OS maps a first memory page, which is accessible by the first device. The guest OS receives a second notification from the hypervisor of a second location of a second device. The at least one guest OS maps a second memory page, which is accessible by the second device. The at least one guest OS specifies a first trust level for the first device and a second trust level for the second device. The at least one guest OS compares the first trust level and a first protection level.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing host-driven application memory protection for virtual machines. Most emulated and virtualized devices (e.g., devices that are part of the hypervisor) may have access to the same memory space as a hypervisor. These emulated devices may be corrupted or attacked by malicious software, which may result in unwanted access to some of the hypervisor memory. Current techniques for providing maximum security involve using an input/output memory management unit (IOMMU) to grant access to a device and later revoking that access. For example, if a device needs to write into memory, an IOMMU may be programmed to grant write access to the device. After the device writes into memory, the IOMMU may revoke the write access. Constant programming of the IOMMU requires expensive virtual machine exits to the hypervisor and slows down the virtual machines significantly. To reduce overhead, the hypervisor may disable the IOMMU completely. However, disabling the IOMMU may prevent the system from using devices from untrusted applications.

As discussed in the various example embodiments disclosed herein, to increase security, an input/output memory management unit (IOMMU) may be used to limit access of specific devices. For example, devices that have access to large amounts of memory and/or devices that may be vulnerable to an attack may have access permissions limited by the IOMMU. Additionally, devices that are trusted (e.g., do not pose a serious threat) may not require additional IOMMU involvement. Thus, the techniques described herein advantageously provide additional security while avoiding the additional overhead of using an IOMMU to grant and/or limit memory access by all the devices in the system.

In an example embodiment, a memory protection system may include a memory, one or more physical processors in communication with the memory, a hypervisor executing on the one or more physical processors, and one or more virtual machines including at least one guest OS executing on the one or more processors.

The hypervisor may notify a guest OS of a virtual machine of the location of several devices. In an example embodiment, a first device may be a virtualized device or an emulated device (e.g., devices that are part of the hypervisor). For example, the first device may be virtualized by the hypervisor. Additionally, the hypervisor may notify the guest OS of a second location of a second device. For example, the second device may be a physical device. Then, the hypervisor may specify a protection level for each device. In an example embodiment, the hypervisor may specify low protection levels to virtualized devices or emulated devices (e.g., devices that are part of the hypervisor). For example, a virtualized device or an emulated device may receive a protection level of zero. Additionally, the hypervisor may specify high protection levels to physical devices (e.g., devices that are not part of the hypervisor). For example, a physical device may receive a protection level of two. In an example embodiment, devices that are not part of the hypervisor may include software devices and/or hardware devices that only have access to part of virtual machine memory.

The hypervisor may notify a virtual machine of the protection level of each device. In an example embodiment, each device may have an associated driver. The hypervisor may specify a protection level for each device and its associated driver. A guest OS may map a first memory page accessible by the first device. For example the guest OS may use a page table that includes permission entries for the first memory page. Additionally, the guest OS may map a second memory page, which is accessible by the second device. The guest OS may specify a trust level for each device and its associated driver. In an example embodiment, the guest OS may specify low trust levels to devices with a userspace driver. For example, devices with a userspace driver may receive a trust level of 'zero'. Additionally, the guest OS may specify high trust levels for devices which are part of the chipset. For example, devices that are part of the chipset may receive a trust level of 'two'.

Then, the guest OS may compare the trust level and protection level associated with each device. If the trust level in a device is higher than the protection level (e.g., trust level=1 and protection level=0), then the device may be granted access to a portion of memory. For example, the trust in the device is higher than the available protection by the hypervisor. If the trust level in a device is less than or equal to the protection level (e.g., trust level=0 and protection level=2), then the guest OS may program the IOMMU to limit the device to part of application memory, which advantageously protects the application. If extra protection is needed for a device (e.g., trust level is ≤to the protection level), the IOMMU may be used to gain extra protection, which advantageously increases security of the system. For example, the IOMMU may limit access by the device by changing the permission associated with the device or by limiting the portion of memory the device may access. If extra protection is not necessary for the device (e.g. trust level is >than the protection level), then additional IOMMU programming may be unnecessary, which advantageously increases performance by reducing overhead required to program the IOMMU to grant access to the device.

In an example embodiment, the guest OS may use a more liberal comparison. For example, the guest OS may compare the trust level to the protection level (e.g., is trust level<protection level). In this situation, if the trust level and the protection level are equal, the IOMMU may grant or maintain access to the device. For example, in the conservative comparison above (e.g., is trust level≤protection level), if the trust level and the protection level are equal, the IOMMU may limit access of the device.

In an example embodiment, the hypervisor may specify a high protection level for devices, which are not part of the hypervisor. Additionally, the hypervisor may specify a low protection level for devices, which is part of the hypervisor. Also, the guest OS may specify a high trust level for devices with a kernel driver, and the guest OS may specify a low trust level for devices with a userspace driver. The IOMMU may be configured by the guest OS to limit access if a device includes a userspace driver. Additionally, the IOMMU may be configured by the guest OS to limit access if the device is not part of the hypervisor. Otherwise, the IOMMU may be configured by the guest OS to grant access to the device to at least a portion of guest memory.

Figure 1:
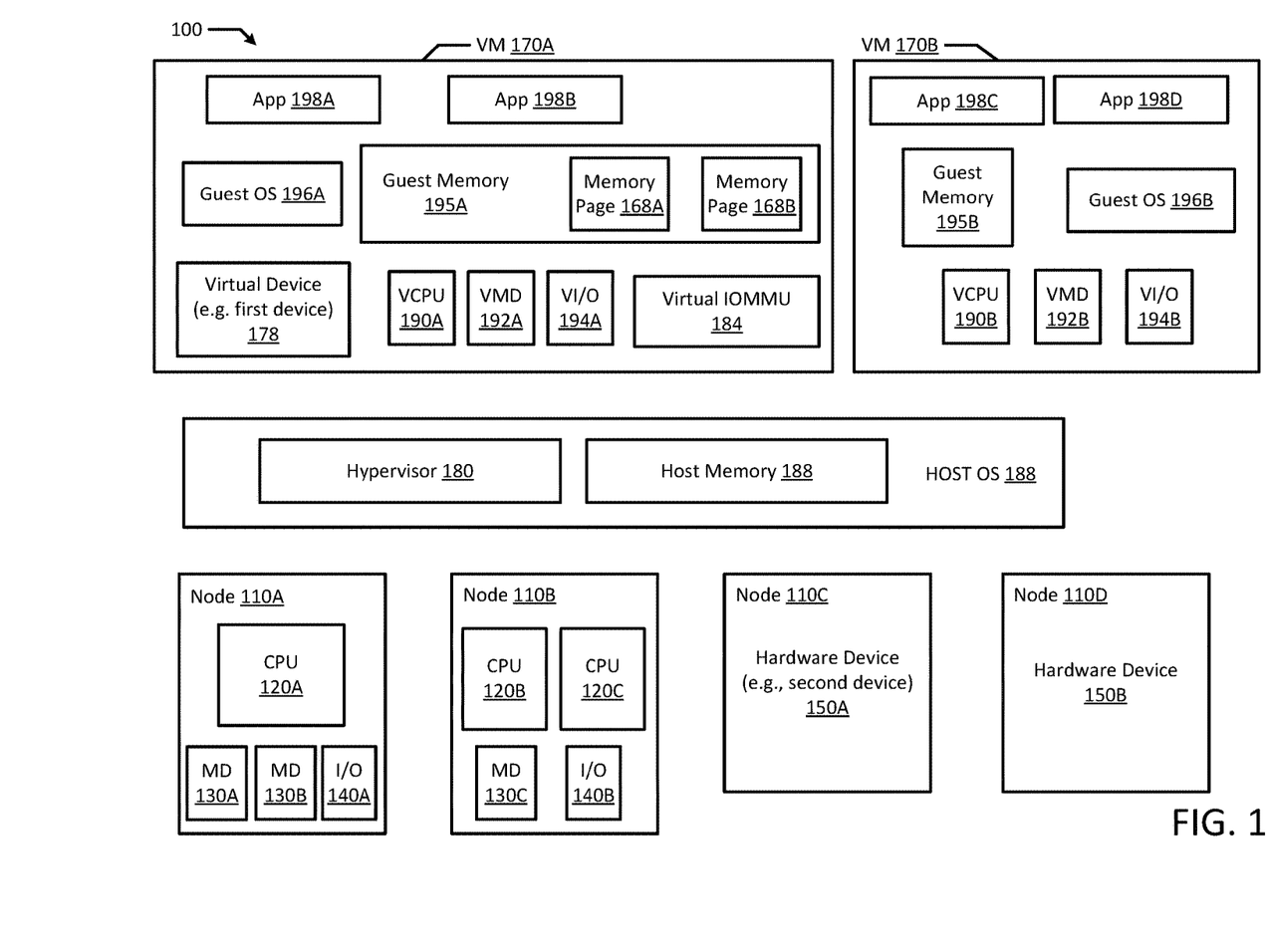
FIG. 1 illustrates a block diagram of an example memory protection system according to an example embodiment of the present disclosure.

FIG. 1 depicts a high-level component diagram of an example memory protection system 100 in accordance with one or more aspects of the present disclosure. The memory protection system 100 may include a memory (e.g., MD 130A-C), one or more physical processors in communication with the memory (e.g., CPU 120A-C), one or more virtual machines (e.g., VM 170A-B), and a hypervisor 180.

The virtual machines 170A-B may include a guest OS (e.g., Guest OS 196A-B), guest memory (e.g., Guest Memory 195A-B), a virtual CPU (e.g., VCPU 190A-B), virtual memory devices (e.g., VMD 192A-B), and virtual input/output devices (e.g., VI/O 194A-B). In an example embodiment, a first virtual machine (e.g., VM 170A) may include a virtual device 178. For example, the virtual device 178 may be virtualized or emulated by the hypervisor 180. Guest memory (e.g., Guest Memory 195A-B) may include one or more memory pages (e.g., Memory Page 168A-B).

As noted above, memory protection system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 executed by the memory protection system 100. In another example embodiment, the hypervisor 180 may be provided by an application running on the operating system 186, or may run directly on the memory protection system 100 without an operating system beneath it. The hypervisor 180 may virtualize the physical layer, including processors, memory, and I/O devices, and present this virtualization to virtual machines 170A-D as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-B (hereinafter, virtual machine 170) may execute a guest operating system 196A-B which may utilize the underlying VCPU 190A-B, VMD 192A-B, and VI/O devices 194A-B. One or more applications 198A-D may be running on a virtual machine 170A-B under the respective guest operating system 196A-B. A virtual machine 170 may run on any type of dependent, independent, compatible, and/or incompatible applications on the underlying hardware and OS 186. In an example embodiment, applications (e.g., App 198A-D) run on a virtual machine 170 may be dependent on the underlying hardware and/or OS 186. In another example embodiment, applications 198A-D run on a virtual machine 170 may be independent of the underlying hardware and/or OS 186. For example, applications 198A-B run on a first virtual machine 170A may be dependent on the underlying hardware and/or OS 186 while applications 198C-D run on a second virtual machine 170B are independent of the underlying hardware and/or OS 186. Additionally, applications 198A-D run on a virtual machine 170 may be compatible with the underlying hardware and/or OS 186. In an example embodiment, applications 198A-D run on a virtual machine 170 may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine 170.

The hypervisor 180 may manage host memory 188 for the host operating system 186 as well as memory allocated to the virtual machines 170A-B and guest operating systems 196A-B such as guest memory 195A-B provided to guest OS 196A-B. Host memory 188 and guest memory 195A-B may be divided into a plurality of memory pages that are managed by the hypervisor 180. Guest memory 195A-B allocated to the guest OS 196A-B may be mapped from host memory 188 such that when a guest application 198A-D uses or accesses a memory page of guest memory 195A-B it is actually using or accessing host memory 188.

The memory protection system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, a physical processor or a processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node and/or between nodes, including the connections between a processor 120A-C and a memory device 130A-C and between a processor 120A and an I/O device 140A may be provided by one or more local buses of suitable architecture, for example, peripheral component interconnect (PCI).

Figure 2:
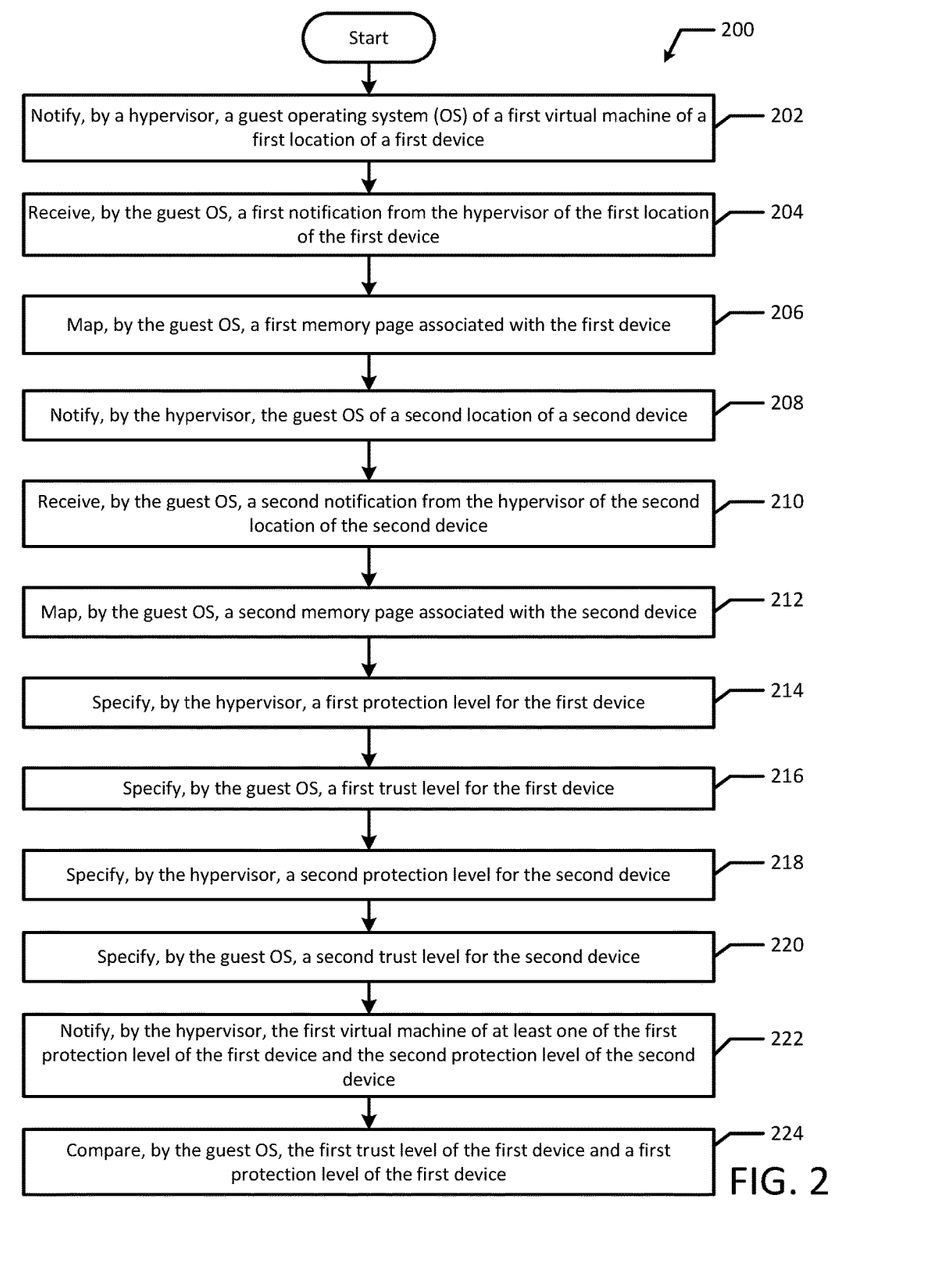
FIG. 2 illustrates a flowchart of an example process for memory protection according to an example embodiment of the present disclosure.

FIG. 2 illustrates a flowchart of an example method 200 for memory protection in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

In the illustrated embodiment, a hypervisor 180 may notify a guest OS (e.g., guest OS 196A-B) of a first virtual machine 170A of a first location of a first device (e.g., virtual device 178) (block 202). For example, the hypervisor 180 may notify the guest OS 196 that the first device 178 is a virtualized or emulated device (e.g., device is part of the hypervisor 180). In an example embodiment, the first location may include a first association. For example, a host device may be associated with a virtual device. A hypervisor may expose access by the guest OS of a virtual machine to a host device through virtual devices which are part of the virtual machine. For example, the hypervisor 180 may notify guest OS 196 of a host device associated with a virtual device (e.g., host device is part of hypervisor). As used herein, location may include the associations of the devices (e.g., are the devices associated with virtual or emulated devices). In an example embodiment, the hypervisor 180 may notify the guest OS 196 by using a new Advanced Configuration and Power Interface (ACPI) table. For example, the ACPI table may be newly created for the guest OS 196. In another example embodiment, the hypervisor 180 may notify the guest OS 196 by updating an existing ACPI table. The ACPI table may include pointers to fixed hardware, system resources, system description, etc. Then, the guest OS 196 may receive a first notification from the hypervisor 180 of the first location of the first device 178 (block 204). For example, the hypervisor 180 may send a signal to the guest OS 196. In an example embodiment, the guest OS 196 may detect the first location of the first device 178. For example, the guest OS 196 may detect that the first device 178 is a virtualized or emulated device (e.g., device is part of the hypervisor 180). In an example embodiment, the guest OS 196 may detect a new entry for the first device 178 in the ACPI table.

The guest OS 196 may map a first memory page (e.g., memory page 168A) associated with the first device 178 (block 206). In an example embodiment, the guest OS 196 may use a page table to map the first memory page 168A. In another example embodiment, the page table may be stored in memory associated with a virtual IOMMU 184. Additionally, the page table may include permission entries (e.g., Read-Write, Read Only, Executable, etc.). In an example embodiment, the permission entry for the first memory page 168A may be unspecified. In another example embodiment, the permission entry for the first memory page 168A may be specified when the first memory page 168A is mapped. For example, the permission entry may be initially set to 'Read Only'. In an example embodiment, the permission entries may be maintained by the virtual IOMMU 184. The hypervisor 180 may notify the guest OS 196 of a second location of a second device (e.g., hardware device 150A-B) (block 208). For example, the hypervisor 180 may notify the guest OS 196 that the second device 150 is a hardware device or a software device with access to a portion of virtual machine memory (e.g., device is not part of the hypervisor 180). As discussed above, the second location may include a second association (e.g., is the device associated with a virtual or emulated device). In an example embodiment, the second device 150 may not be associated with a virtual device (e.g., device is not part of the hypervisor 180). For example, the hypervisor 180 may not expose access by guest OS 186 to the second device 150 through any virtual devices, and thus, the second device 150 may not have any association with a virtual device. In an example embodiment, the hypervisor 180 may notify the guest OS 196 by using a new ACPI table. Then, the guest OS 196 may receive a second notification from the hypervisor 180 of the second location of the second device 150 (block 210). For example, the hypervisor 180 may send a signal to the guest OS 196. In an example embodiment, the guest OS 196 may detect the second location of the second device 150. For example, the guest OS 196A may detect that the second device 150 is a physical device such as a hardware device (e.g., device is not part of the hypervisor 180). In an example embodiment, the guest OS 196 may detect a new entry for the second device 150 in the ACPI table. The guest OS 196 may map a second memory page associated with the second device 150 (block 212). In an example embodiment, the guest OS 196 may use a page table to map the second memory page. Additionally, the page table may include permission entries (e.g., Read-Write, Read Only, Executable, etc.). In an example embodiment, the permission entry for the second memory page may be unspecified. In another example embodiment, the permission entry for the second memory page may be specified when the guest OS 196 maps the second memory page. For example, the permission entry may be initially set to 'Read-Write'.

Then, the hypervisor 180 may specify a first protection level for the first device 178 (block 214). In an example embodiment, the first protection level may range from zero to two. In another example embodiment, other ranges may be used (e.g., 1 to 10, 0 to 5, etc.). Additionally, protection levels may be ranked as high protection, medium protection, and low protection or with some other non-numerical designation. In an example embodiment, the hypervisor 180 may specify the lowest protection level (e.g., zero on a protection level scale of 0 to 2) for devices such as virtualized and/or emulated devices (e.g., devices that are part of the hypervisor). Additionally, the hypervisor 180 may specify a medium protection level (e.g., one on a protection level scale of 0 to 2) for software devices, which are not part of the hypervisor but have access to at least a portion of virtual machine memory and may have access to all of virtual machine memory. In an example embodiment, the hypervisor 180 may specify the highest protection level (e.g., 2 on a protection level scale of 0 to 2) for hardware devices or software devices, which only have access to part of virtual machine memory.

The guest OS 196 may specify a first trust level for the first device 178 (block 216). In an example embodiment, the first trust level may range from zero to two. In another example embodiment, other ranges may be used (e.g., 1 to 10, 0 to 5, etc.). Additionally, trust levels may be ranked as high trust, medium trust, and low trust. In an example embodiment, the guest OS 196 may specify the lowest trust level (e.g., zero on a trust level scale of 0 to 2) for devices with a userspace driver. For example, the guest OS 196 may specify the lowest trust level to a virtualized guest device with a userspace driver. Additionally, the guest OS 196 may specify a medium trust level (e.g., one on a trust level scale of 0 to 2) for in-kernel devices or devices with a signed driver. For example, a signed driver is a device driver that includes a digital signature such as an electronic security mark that may indicate the publisher of the software. In an example embodiment, the digital signature may indicate whether the original contents of the driver package have been changed. For example, the guest OS 196 may specify a medium trust level for an NIC with a signed driver. In an example embodiment, the guest OS 196 may specify the highest trust level (e.g., two on a trust level scale of 0 to 2) for chipset devices (e.g., devices that are part of the chipset). For example, the guest OS 196 may specify the highest trust level (e.g., two) to a graphics controller on the chipset.

The hypervisor 180 may specify a second protection level for the second device 150 (block 218). In the illustrated embodiment, the first device 178 is a virtual device (e.g., protection level of zero) and the second device is a hardware device (e.g., protection level of two). The guest OS 196A may specify a second trust level for the second device 150 (block 220). In the illustrated embodiment, the first device 178 is a virtual device with a userspace driver (e.g., trust level of zero) and the second device 150 is a hardware device with a signed driver (e.g., trust level of one). For example, the second device may be an NIC with a signed driver. The hypervisor 180 may notify the first virtual machine 170A of at least one of the first protection level of the first device 178 and the second protection level of the second device 150 (block 222). For example, the guest OS 196A may receive a notification from the hypervisor 180 that the first protection level of the first device 178 is 'zero' and that the second protection level of the second device 150 is 'one'. In an example embodiment, the hypervisor 180 may also notify a second virtual machine (e.g., VM 170B) of the first protection level and the second protection level.

Then, the guest OS 196 may compare the first trust level of the first device 178 and the first protection level of the first device 178 (block 224). For example, the guest OS 196 may compare the first trust level (e.g., zero) with the first protection level (e.g., zero) for the virtual device with a userspace driver. In an example embodiment, if the trust level is less than or equal to the protection level (e.g., trust level of $0 \leq$ protection level of 0), the guest OS 196 may program an IOMMU (e.g., virtual IOMMU 184) to limit memory access by the first device 178. A virtual IOMMU 184 advantageously allows the guest OS 196 to defend against its own device driver bugs. Additionally, a virtual IOMMU 184 advantageously provides a more flexible form of device pass-through, enabling a virtual machine (e.g., VM 170A-B) to interact with a directly assigned I/O device without hypervisor intervention (e.g., intervention by hypervisor 180). For example, the first device 178 may be limited to part of application memory and/or the permission associated with the first device 178 may be limited. In the example above, the first device (e.g., virtual device with userspace driver) is trusted less than the device is protected, and the access may advantageously be limited to increase security of the system. In an example embodiment, the virtual IOMMU 184 may limit the access to 'Read-Only' to protect the application. In an example embodiment, the virtual IOMMU 184 may limit access by specifying an appropriate permission entry in the page table associated with the first memory page 168A. For example, if the permission entry for the first memory page 168A was originally unspecified, the virtual IOMMU 184 may specify a limited permission entry such as 'Read-Only'. In another example embodiment, the virtual IOMMU 184 may limit memory access of the first device 178 to a part of application memory. For example, if the first device 178 was originally associated with a first part and a second part of application memory, the virtual IOMMU 184 may limit access by the first device 178 to the first part of application memory by restricting access to the second part of application memory.

The guest OS 196 may also compare the second trust level (e.g., two) with the second protection level (e.g., one) for the NIC with a signed driver. In the above example, the trust level is greater than the protection level (e.g., trust level of 2>protection level of 1), the guest OS 196 may program the virtual IOMMU 184 to grant access to the second device 150 (e.g., NIC with signed driver). In the above example, the second device 150 is trusted more than the device is protected, so access may be granted to the second device 150. For example, access may be granted or maintained (e.g., not limited) because the second device 150 may not pose a significant security threat to the system. In an example embodiment, further involvement by the virtual IOMMU 184 may be unnecessary. In another example embodiment, the virtual IOMMU 184 may grant access to 'Read-Write'. In an example embodiment, the virtual IOMMU 184 may grant access by specifying an appropriate permission entry in the page table associated with the second memory page. For example, if the permission entry for the second memory page was originally unspecified, the virtual IOMMU 184 may specify a permission entry of 'Read-Write'. In another example embodiment, the virtual IOMMU 184 may grant access of the second device 150 (e.g., NIC with signed driver) to a part of application memory. For example, if the second device 150 was originally associated with a third part and a fourth part of application memory, the virtual IOMMU 184 may maintain (e.g., not limit) access to the third part and fourth part of application memory. In another example embodiment, the virtual IOMMU 184 may grant access to both the third part and the fourth part of application memory.

In another example embodiment, the virtual IOMMU 184 may maintain or grant access to the third part of application memory and limit access to the fourth part of application memory. For example, the third part of application memory may be designated as 'Read-Write' while the fourth part is designated as 'Read and Execute'. Other combinations of permission entries and access may also be used.

In another example embodiment, the system 100 may have several virtual machines that are configured and operate similar to VM 170A. For example, the hypervisor 180 may notify several virtual machines and their respective guest operating systems of the locations of different devices. The respective guest operating systems may specify trust levels for the different devices and may compare the trust levels to the protection levels. In an example embodiment, the virtual machines may use different comparison standards (e.g., liberal or conservative).

Figure 3A:
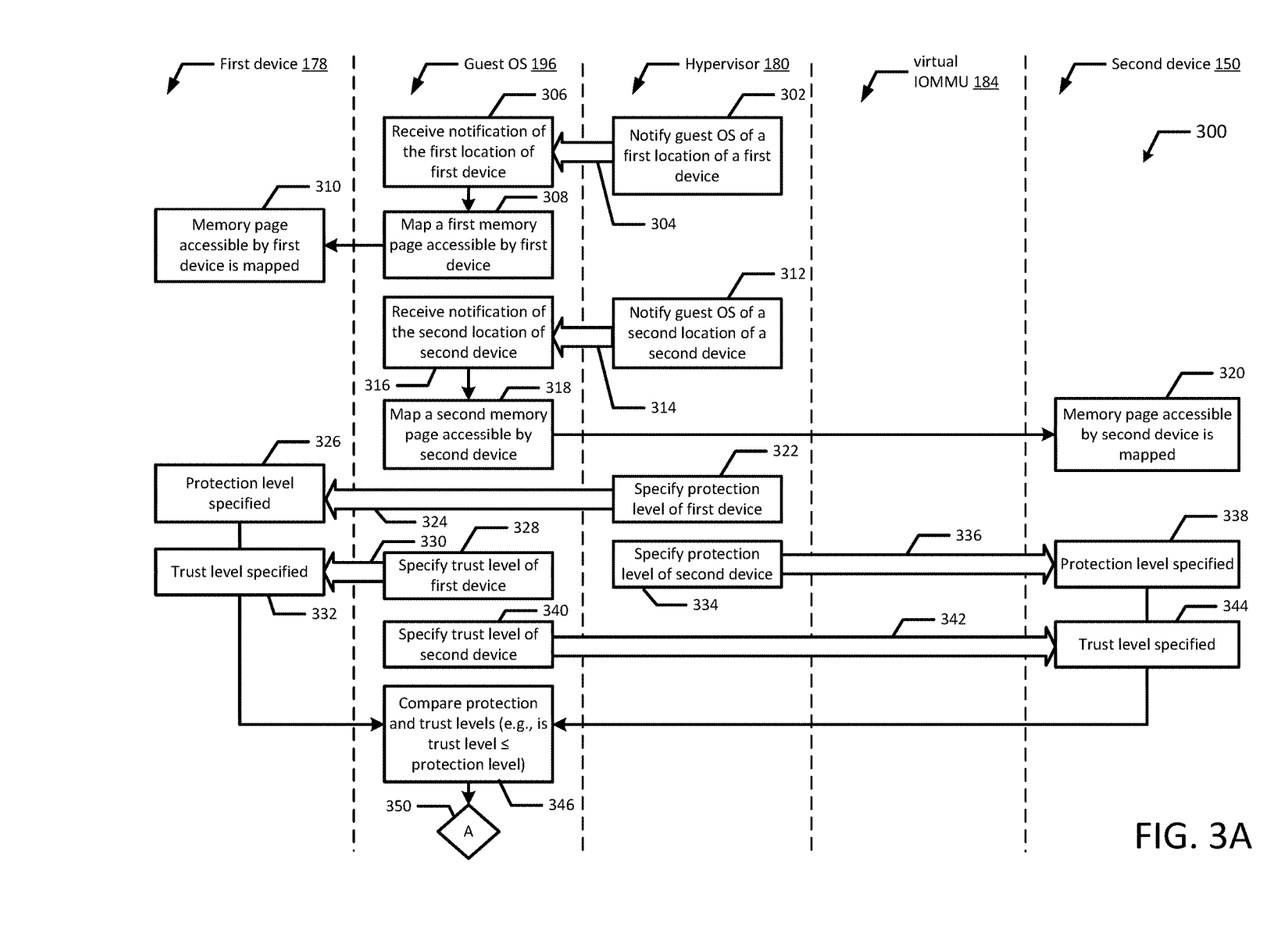
FIGS. 3A and 3B illustrate a flow diagram of an example process for memory protection according to an example embodiment of the present disclosure.
Figure 3B:
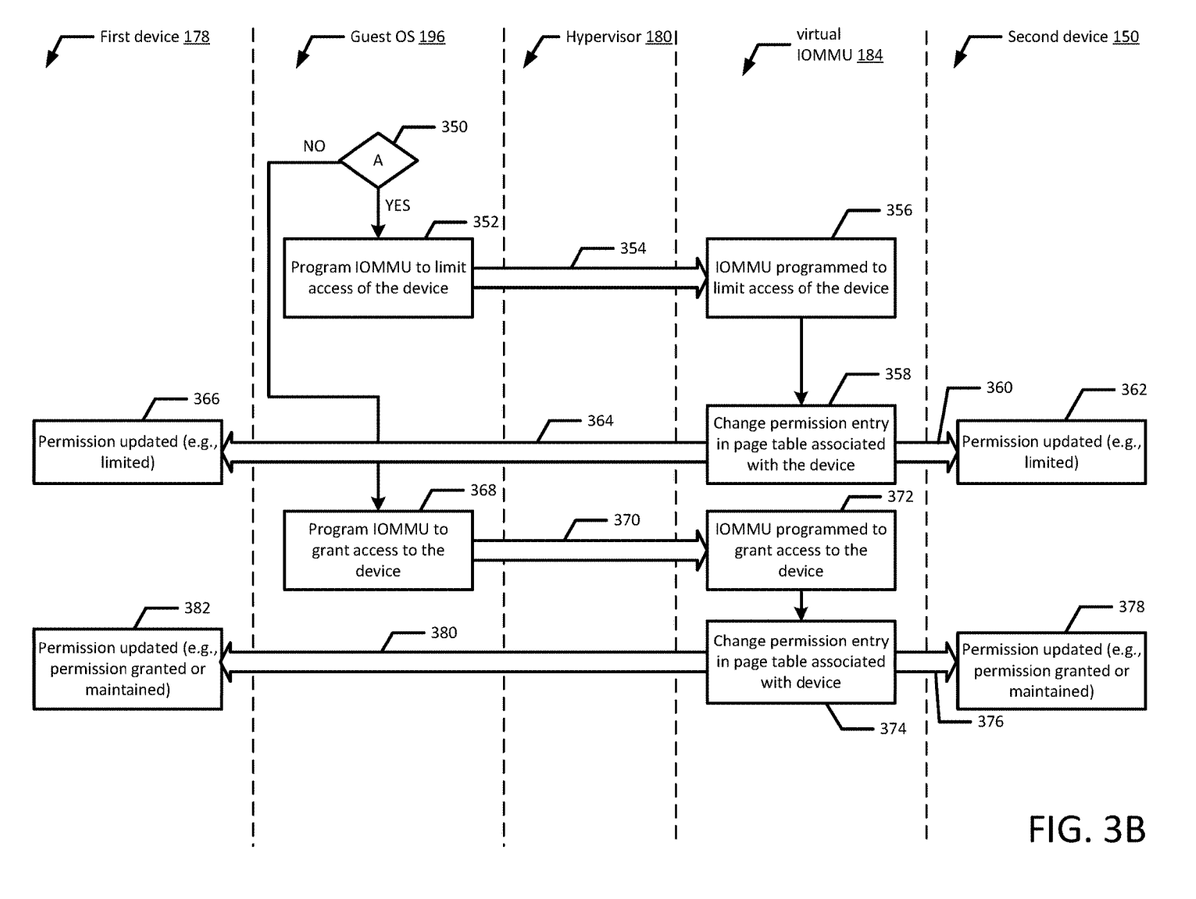

FIGS. 3A and 3B depict a flow diagram illustrating an example method 300 for receive packet processing according to an example embodiment of the present disclosure.

Although the example method 300 is described with reference to the flow diagram illustrated in FIGS. 3A and 3B, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuity, dedicated logic, etc.), software, or a combination of both.

In the illustrated example embodiment, a hypervisor 180 may notify a guest OS 196A (hereinafter guest OS 196) of a first location of a first device 178 (bocks 302 and 304). In an example embodiment, the first device 178 may be a virtualized device. For example, the first device may be a virtualized by the hypervisor 180. In another example embodiment, the hypervisor 180 may notify guest OS 196B of the first location of the first device 178. Additionally, the hypervisor 180 may notify the guest OS 196 by using a new ACPI table or by updating an existing ACPI table. Then, the guest OS 196 may receive a notification of the first location of the first device 178 (block 306). In an example embodiment, the guest OS 196 may detect the first location of the first device 178. For example, the guest OS 196 may detect a new entry in the ACPI table. The guest OS 196 may map a first memory page 168A accessible by the first device 178 (blocks 308 and 310). In an example embodiment, the guest OS 196 may use a page table to map the first memory page 168A. In another example embodiment, a first plurality of memory pages (e.g., Memory Page 168A-B) may be accessible by the first device 178.

The hypervisor 180 may notify the guest OS 196 of a second location of a second device (e.g., hardware device 150A-B) (blocks 312 and 314). In an example embodiment, the second device 150 may be a physical device of the host OS 186. For example, the second device 150 may be a hardware device (e.g., hardware device 150A-B). In another example embodiment, the second device may be a paravirtualized device. The guest OS 196 may receive a second notification of the second location of the second device 150. (block 316). In an example embodiment, the guest OS 196 may detect the second location of the second device 150. For example, the guest OS 196 may detect a new entry in the ACPI table. Additionally, the guest OS 196 may receive a message or signal from the hypervisor 180 indicating the location of the second device 150. Then, the guest OS 196 may map a second memory page accessible by the second device 150 (blocks 318 and 320). In an example embodiment, the guest OS 196 may use a page table to map the second memory page. In another example embodiment, a second plurality of memory pages may be accessible by the second device 150.

The hypervisor 180 may specify a protection level of the first device 178 (blocks 322 to 326). In an example embodiment, the protection level may depend on the location of the first device. In another example embodiment, the protection level may depend on the amount of memory the first device has access to. In the illustrated embodiment, the first device is virtualized by the hypervisor 180 and may be assigned the lowest protection level (e.g., a protection level of zero). Additionally, the hypervisor 180 may notify the guest OS 196 of the protection level of the first device 178. The guest OS 196 may specify a first trust level of the first device 178 (blocks 328 to 332). For example, in the illustrated embodiment, the first device 178 is a virtualized device and the guest OS 196 may specify a trust level of 'zero'. In an example embodiment, the guest OS 196 may specify a trust level after the hypervisor 180 specifies a protection level. In another example embodiment, the guest OS 196 may specify a trust level before the hypervisor 180 specifies a protection level. In yet another example embodiment, the guest OS 196 and the hypervisor 180 may specify a trust level and a protection level at the same time.

The hypervisor 180 may specify a protection level of a second device 150 (blocks 334 to 338). In the illustrated embodiment, the second device 150 is physical hardware device that may be assigned a medium protection level (e.g., a protection level of one). In an example embodiment, the second device 150 may be an in-kernel device. In another example embodiment, the second device 150 may be associated with a signed driver. Additionally, the hypervisor 180 may notify the guest OS 196 of the protection level of the second device. The guest OS 196 may specify a trust level of the second device 150 (blocks 340 to 344). For example, in the illustrated embodiment, the second device 150 is a physical hardware device and the guest OS 196 may specify a trust level of 'one'. In an example embodiment, the guest OS 196 may specify the second trust level before, after, or at the same time the hypervisor 180 specifies the second protection level.

Then, the guest OS 196 may compare the protection levels and trust levels associated with each device (e.g., first device 178 and second device 150) (blocks 346 and 350). If the trust level is less than or equal to the respective protection level, the guest OS 196 may program a virtual IOMMU 184 to limit access of the first device 178 (blocks 352 to 356). The virtual IOMMU 184 advantageously provides additional protection to the system by limiting memory access by a device (e.g., first device 178 and second device 150). The virtual IOMMU 184 may change a permission entry in a page table associated with the second device 150 (blocks 358 and 360). In an example embodiment, the page table may be an IOMMU page table. In an example embodiment, the permission entry may be changed from 'Read-Write' to 'Read Only' based on the comparison of the trust level and the protection level. Responsive to the virtual IOMMU 184 changing a permission entry, the permission for the second device 150 may be updated (block 362). If the first trust level of the first device 178 is less than or equal to the first protection level, the virtual IOMMU 184 may change the permission entry in the page table associated with the first device 178 (blocks 358 and 364). For example, the virtual IOMMU 184 may limit access by the first device 178 by changing the permission entry from 'None' to 'Read Only'. Then, the permission for the first device may be updated (block 366). In another example embodiment, the virtual IOMMU 184 may limit access by limiting the amount of memory accessible by the first device. For example, the virtual IOMMU 184 may limit access to a first memory page 168A of a plurality of memory pages (e.g., Memory Page 168A-B).

If the trust level is not less than or equal to the protection level (i.e., trust level is greater than the protection level), the guest OS 196 may program the IOMMU 184 to grant access to the device (e.g., device 178 and/or device 150) (block 368 to 372). In an example embodiment, the virtual IOMMU 184 may not need to be programmed and may not perform any additional operations. For example, the virtual IOMMU 184 may maintain access (e.g., not limit access). Then, the IOMMU 184 may change a permission entry in the page table associated with second device 150 (blocks 374 and 376). In an example embodiment, the virtual IOMMU 184 may change a permission entry in the page table. For example, a permission entry may be 'Read, Write, and Execute'; 'Read-Write'; 'Read and Execute'; 'Read Only'; 'Write and Execute'; 'Write Only'; 'Execute Only'; or 'None'. In an example embodiment, the page table permission entry may be changed from 'None' to 'Read and Write'. Additionally, in another example embodiment, the virtual IOMMU may grant access by maintaining a permission entry. For example, if the permission entry is 'Read, Write and Execute' for the second device 150 (e.g., trust level is greater than the protection level), then the virtual IOMMU 184 may leave the permission entry unchanged. Then, the permission may be updated in the second device 150 (block 378). Similarly, if the trust level is greater than the protection level for the first device, the virtual IOMMU 184 may change the permission entry associated in a page table associated with the first device 150 (blocks 374 and 380). Responsive to the virtual IOMMU 184 changing the permission entry, the permission may be updated in the first device 178 (block 382). In an example embodiment, permission entries may be established during mapping, which may occur after either a protection level and/or a trust level is specified. This may advantageously allow the protection system to gain performance for high trust and/or low protection systems. For example, if the trust level is higher than the performance level, the protection system may gain performance because there may be no need to program the virtual IOMMU 184 to grant access to a device. The access for the device may have already been established and there is no need to limit the access by the virtual IOMMU 184. This advantageously improves performance by reducing system overhead.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A system comprising:
a memory including a memory page;
one or more physical processors in communication with the memory;
a hypervisor executing on the one or more physical processors; and
one or more virtual machines including at least one guest operating system (OS) executing on the one or more processors,
wherein the hypervisor executing on the one or more physical processors is configured to:

notify the at least one guest OS of a first virtual machine of a first location of a first device,
notify the at least one guest OS of a second location of a second device,
specify a first protection level for the first device,
specify a second protection level for the second device, and
notify the one or more virtual machines of at least one of the first protection level of the first device and the second protection level of the second device,
wherein the at least one guest OS, executing on the one or more physical processors, is configured to:
receive a first notification from the hypervisor of the first location of the first device,
map a first memory page, wherein the first memory page is accessible by the first device,
receive a second notification from the hypervisor of the second location of the second device,
map a second memory page, wherein the second memory page is accessible by the second device,
specify a first trust level for the first device,
specify a second trust level for the second device, and
compare the first trust level and the first protection level.

2. The system of claim 1, wherein the first location includes a first association and the second location includes a second association.

3. The system of claim 1, further comprising a virtual input/output memory management unit (IOMMU), wherein the virtual IOMMU is part of the one or more virtual machines, the virtual IOMMU is configured to limit access of the first device to a first part of application memory when the first trust level is lower than or equal to the first protection level.

4. The system of claim 3, wherein a mapping of the first memory page uses a first page table, the first page table is stored in a first memory associated with the virtual IOMMU, the mapping of the second memory page uses a second page table, and the second page table is stored in a second memory associated with the virtual IOMMU.

5. The system of claim 3, wherein the virtual IOMMU is configured to grant access of the first device to a second part of the application memory when the first trust level is greater than the first protection level.

6. The system of claim 3, wherein the virtual IOMMU is configured to limit access to the first device when at least one of (i) the first device includes a userspace driver, and (ii) the first device is not part of the hypervisor.

7. The system of claim 1, wherein the first device is not part of the hypervisor, the second device is part of the hypervisor, and the first protection level is higher than the second protection level.

8. The system of claim 1, wherein the first device includes a kernel driver, the first trust level is a high trust level, the second device includes a userspace driver, and the second trust level is a low trust level.

9. A method comprising:
notifying, by a hypervisor, a guest OS of a first virtual machine of a first location of a first device;
receiving, by a guest OS, a first notification from the hypervisor of the first location of the first device;
mapping, by the guest OS, a first memory page, wherein the first memory page is accessible by the first device;
notifying, by the hypervisor, the guest OS of a second location of a second device;
receiving, by the guest OS, a second notification from the hypervisor of the second location of the second device;
mapping, by the guest OS, a second memory page, wherein the second memory page is accessible by the second device;
specifying, by the hypervisor, a first protection level for the first device;
specifying, by the hypervisor, a second protection level for the second device;
specifying, by the guest OS, a first trust level for the first device;
specifying, by the guest OS, a second trust level for the second device;
notifying, by the hypervisor, the first virtual machine of at least one of the first protection level of the first device and the second protection level of the second device; and
comparing, by the guest OS, the first trust level and the first protection level.

10. The method of claim 9, further comprising:
programming, by the guest OS, a virtual input/output memory management unit (IOMMU) to limit access of the first device to a first part of application memory when the first trust level is lower than or equal to the first protection level.

11. The method of claim 10, wherein the virtual IOMMU changes a permission entry in order to limit access of the first device.

12. The method of claim 9, further comprising:
programming, by the guest OS, the virtual input/output memory management unit (IOMMU) to grant access of the first device to a first part of application memory when the first trust level is greater than the first protection level.

13. The method of claim 12, wherein the virtual IOMMU changes a permission entry in order to grant access of the first device.

14. The method of claim 12, wherein the virtual IOMMU maintains a permission entry in a page table.

15. The method of claim 9, wherein the mapping of the first memory page uses a first page table, wherein the first page table is stored on the virtual input/output memory management unit (IOMMU).

16. The method of claim 9, wherein the mapping of the second memory page uses a second page table, wherein the second page table is stored on the virtual input/output memory management unit (IOMMU).

17. A non-transitory machine readable medium storing a program, which when executed by a processor, causes at least one guest OS of a first virtual machine to:
receive a first notification from a hypervisor of a first location of a first device;
map a first memory page, wherein the first memory page is accessible by the first device;
receive a second notification from the hypervisor of a second location of a second device;
map a second memory page, wherein the second memory page is accessible by the second device;
specify a first trust level for the first device;
specify a second trust level for the second device; and
compare the first trust level and a first protection level.

18. The non-transitory machine readable medium of claim 17, wherein the non-transitory machine readable medium causes the hypervisor to:
notify the at least one guest OS of the first location of the first device;
notify the at least one guest OS of the second location of the second device;
specify the first protection level for the first device;

specify a second protection level for the second device; and notify the at least one guest OS of at least one of the first protection level of the first device and the second protection level of the second device.

19. The non-transitory machine readable medium of claim 17, wherein the non-transitory machine readable medium further causes the at least one guest OS to program a virtual input/output memory management unit (IOMMU) to limit access of the first device to a first part of application memory when the first trust level is lower than or equal to the first protection level.

20. The non-transitory machine readable medium of claim 17, wherein the non-transitory machine readable medium further causes the at least one guest OS to program the virtual input/output memory management unit (IOMMU) to grant access of the first device to a second part of the application memory when the first trust level is greater than the first protection level.

* * * * *